(12) United States Patent
Abel et al.

(10) Patent No.: US 8,804,764 B2
(45) Date of Patent: Aug. 12, 2014

(54) DATA PATH FOR DATA EXTRACTION FROM STREAMING DATA

(75) Inventors: Francois Abel, Sierentz (FR); Jean L. Cavignac, Raleigh, NC (US); Christoph Hagleitner, Zurich (CH); Jonathan B. Rohrer, Zurich (CH); Jan Van Lunteren, Gattikon (CH); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 12/974,689

(22) Filed: Dec. 21, 2010

(65) Prior Publication Data

US 2012/0155492 A1 Jun. 21, 2012

(51) Int. Cl.
*H04J 3/24* (2006.01)

(52) U.S. Cl.
USPC .......................................... 370/474; 370/412

(58) Field of Classification Search
USPC ............ 370/395.64, 412–418, 537, 538–539, 370/474–476; 710/1–74
See application file for complete search history.

(56) References Cited

U.S. PATENT DOCUMENTS

| | | | |
|---|---|---|---|
| 5,113,523 A | 5/1992 | Colley et al. | |
| 6,816,490 B1 | 11/2004 | Chung | |
| 6,965,646 B1 | 11/2005 | Firestone | |
| 7,187,694 B1 | 3/2007 | Liao | |
| 2002/0188773 A1* | 12/2002 | Augustijn et al. | 710/52 |
| 2003/0039247 A1 | 2/2003 | Henriksson et al. | |
| 2005/0089160 A1 | 4/2005 | Crispin et al. | |
| 2005/0141534 A1* | 6/2005 | Kawabata et al. | 370/411 |
| 2006/0174089 A1 | 8/2006 | Altman et al. | |
| 2006/0224862 A1 | 10/2006 | Ahmed et al. | |
| 2007/0282573 A1 | 12/2007 | Fritz et al. | |
| 2008/0109635 A1 | 5/2008 | Shih | |
| 2009/0193226 A1 | 7/2009 | Takayama et al. | |
| 2010/0058030 A1 | 3/2010 | Yoshizawa | |
| 2010/0191865 A1 | 7/2010 | Wang et al. | |
| 2011/0320653 A1* | 12/2011 | Lais et al. | 710/65 |
| 2012/0159132 A1 | 6/2012 | Abel et al. | |

* cited by examiner

*Primary Examiner* — Kwang B Yao
*Assistant Examiner* — Tung Q Tran
(74) *Attorney, Agent, or Firm* — Cantor Colburn LLP; Daniel Morris (57) ABSTRACT

A data path for streaming data includes a plurality of sequential data registers, each of the plurality of sequential data registers comprising a plurality of data fields, wherein the streaming data moves sequentially through the sequential data registers; and a multiplexing unit, the multiplexing unit configured such that the multiplexing unit has access to each of the plurality of data fields of the plurality of sequential data registers, and wherein the multiplexing unit is configured to extract data from the streaming data as the streaming data moves through the sequential data registers in response to a data request.

11 Claims, 9 Drawing Sheets

DATA PATH FOR DATA EXTRACTION FROM STREAMING DATA

FIELD

This disclosure relates generally to the field of the inspection and processing of a stream of data received over a communication channel.

DESCRIPTION OF RELATED ART

Data transferred over a communication channel may be provided in a streaming mode, which is a serial sequence of information. An advantage of streaming data is that the receiver may start processing the content of the data stream before the entire stream is received. Streaming data may include various types of content, such as video, audio, or multimedia content. Streaming enables the data to be played back as soon as it is received, thus reducing the delay at the receiver before the media can be presented to the user.

Streaming data is supported by underlying networks and protocols that are used to transport the data stream. Every datagram, cell, packet, and frame transferred over a network is formatted as a stream of bits. Sequential ordering of information is inherent to protocols used to transfer streaming data over a network, as sequential ordering of streamed information reduces the amount of processing required at the receiver. The beginning of a stream may contain one or multiple fields of information regarding the rest of the stream. For example, the first digit of an internet protocol (IP) datagram may indicate the IP version of the stream.

Sequential ordering enables flexible protocol stack combinations, which allow different sets of computers running different high-level network protocols to share the same physical media. For example, the stacking of transmission control protocol (TCP) over IP protocol may be indicated by the protocol field of the IP header datagram, which is transferred ahead of the payload part of the IP datagram used to embed the TCP datagram. TCP over IP is also referred to as protocol encapsulation because it turns a given network layer into a trucking service that is unaware of the data it carries for the upper layer applications, enabling protocols to be deployed with flexible options. For example, the next header field of an IPv6 datagram may encode a higher layer protocol such as TCP or user datagram protocol (UDP), or may indicate that the next datagram is one of the IPv6 extension headers and that it is carrying some additional options related to current IP protocol layer.

The receiver may need to extract one or more particular fields, such as header information, from a stream of data as it is received in order to properly process the rest of the data stream according to the correct protocol. This may be achieved by reading the streaming data into a temporary physical buffer, and advancing a stream pointer through the buffer to extract the needed data from its position in the stream. However, advancing a stream pointer through a buffer may be a relatively slow process. Also, because of protocol stacking and protocol encapsulation, the exact numbers of bytes that make up a header stack may not be known before the stream parsing is done. Therefore, an arbitrary number of bytes must be allocated to the header buffer in order to account for both short packets (e.g. a 42 bytes DIX/IPv4/UDP) as well as long packets (e.g. a 206 bytes DIX/IPv6+Destination+Routing+Fragment-extension-headers/TCP). Although main memory may be cheap and abundant in today's computers, it is a scarce resource for a system on a chip (SoC) and similar VLSI devices, in which multiple functions share a limited amount of area and power on the silicon. Because of memory constraints, hardware packet parsers and protocol processors may only process a limited amount of an incoming stream by dedicating a finite number of buffers to the stream data. In general, only the first few tens or hundreds first bytes can be processed, which may corresponds to the minimum size required to hold the protocol stack headers of a frame of some formats of streaming data. However, other formats, such as InfiniBand (IB) or Ethernet, operate with maximum transfer unit (MTU) sizes of multiple kilobytes.

The processing of variable length fields must also be supported. For example, an IPv6 header is composed of field sizes that span from 4 bits (e.g., the IP version) up to 128 bits (e.g., the IP source and destination addresses). Although large fields used to be segmented into smaller fields of fixed size, the solution is not practical at multi-gigabit/s data rates because of the dependency between the data rate and the stream processing frequency (processing frequency=data_rate/field size). The smaller the field size, the higher the processing frequency needs to be. Therefore, processing a 10 Gb/s Ethernet stream on the basis of fixed field sizes of 8 bits has to be performed at a frequency of 1.25 GHz, which is relatively hard to achieve given the number of fields that must be evaluated and processed in every clock cycle. One solution for relaxing the processing frequency is widening the size of the fixed field from 8 to 16, 32 or 64 bits, and to provide some filtering mask mechanism for extracting shorter fields such as the Ethernet type/len (16 bits) or the IP protocol (8 bits). For example, the IP version (4 bits) can be extracted from a fixed field of 16 bits by isolating the appropriate digit with a mask such as 0xF000, 0x0F00, 0x00F0 or 0x000F. However, since most of the network and media protocols are digit- and/or byte-based, the management and the generation of such masks is a relatively complex process.

A stream processing application may be difficult to accelerate by means of parallelization techniques because of intrinsic sequential data representation. For the case of network protocol processing, this means that the beginning of a network frame typically contains one or multiple fields indicating what the rest of the frame is about. For example, the processing of the 5th and 6th bytes of an IP datagram cannot start before the IP version has been identified by processing the first digit of the datagram: bytes 5-6 of IPv4 encode the "IPv4 Fragment Identification", while bytes 5-6 of IPv6 encode the "IPv6 Payload Length".

SUMMARY

In one aspect, a data path for streaming data includes a plurality of sequential data registers, each of the plurality of sequential data registers comprising a plurality of data fields, wherein the streaming data moves sequentially through the sequential data registers; and a multiplexing unit, the multiplexing unit configured such that the multiplexing unit has access to each of the plurality of data fields of the plurality of sequential data registers, and wherein the multiplexing unit is configured to extract data from the streaming data as the streaming data moves through the sequential data registers in response to a data request.

In another aspect, a method for extracting data from streaming data in a data path includes moving the streaming data sequentially though a plurality of sequential data registers of the data path, each of the plurality of sequential data registers comprising a plurality of data fields; and extracting data from the streaming data as the streaming data moves through the sequential data registers by a multiplexing unit in response to a data request, wherein the multiplexing unit is configured such that the multiplexing unit has access to each of the plurality of data fields of the plurality of sequential data registers.

In another aspect, a computer program product including a computer readable storage medium containing computer code that, when executed by a computer, implements a method for extracting data from streaming data in a data path, wherein the method includes moving the streaming data sequentially though a plurality of sequential data registers of the data path, each of the plurality of sequential data registers comprising a plurality of data fields; and extracting data from the streaming data as the streaming data moves through the sequential data registers by a multiplexing unit in response to a data request, wherein the multiplexing unit is configured such that the multiplexing unit has access to each of the plurality of data fields of the plurality of sequential data registers.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a data path for data extraction from streaming data, and methods of operating a data path for data extraction from streaming data, are provided, with exemplary embodiments being discussed below in detail. Acceleration of processing of sequential streaming data may be achieved by enabling multiple variable length fields in the streaming data to be extracted from any position in the stream at the same time. The data path includes a pipeline made up of a plurality of data registers, combined with one or more multiplexers. The pipeline acts as a window sliding over the incoming data stream, while the multiplexers may flexibly extract any required data from the streaming data as it moved through the pipeline, thereby exposing the streaming data to a stream processor.

Embodiments of a data path for data extraction from streaming data may be implemented in hardware with a relatively small footprint, thus minimizing the logic area utilization and associated power consumption. Support for cut-through processing may be provided, minimizing the processing latency. Only the portion of the data stream that is currently being processed needs to be buffered. Latency is further reduced by simultaneously extracting data from a portion of a data stream while loading additional data from the stream into the pipeline.

Figure 1:
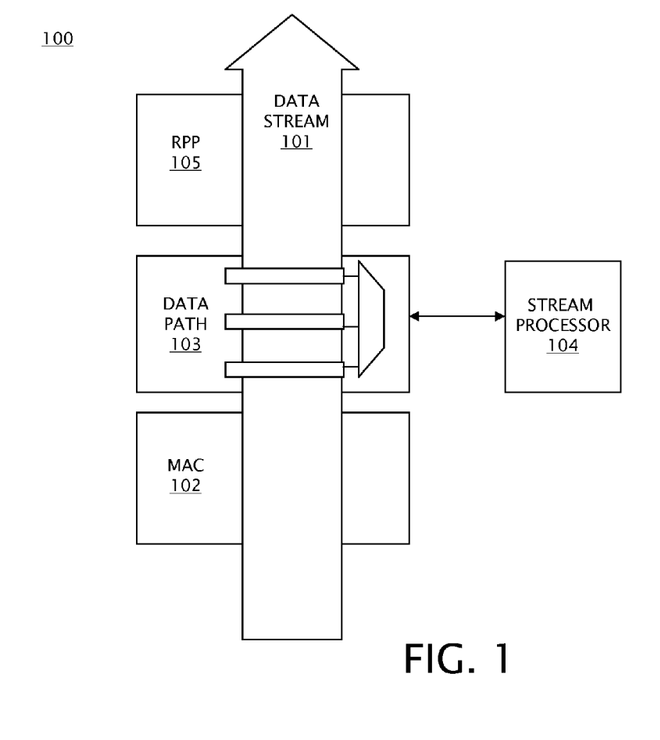
FIG. 1 illustrates an embodiment of a data streaming system including a data path for data extraction from streaming data.

FIG. 1 illustrates an embodiment of a data streaming system 100 including a data path 103 for data extraction from streaming data. Data streaming system 100 receives a data stream 101 from a network at medium access control (MAC) 102. Data stream 101 may include any type of streamed data, including but not limited to video or audio. The data stream 101 is transferred from MAC 102 to data path 103. Stream processor 104 requests specific data located in data stream 101 from data path 103 (including but not limited to data indicating the protocol of data stream 101), and data path 103 extracts the requested data from data stream 101 as described in further detail below. The data stream 101 then proceeds to received packet processing (RPP) module 104, which may perform such functions as playback in embodiment in which data stream 101 includes audio or video data.

Figure 2:
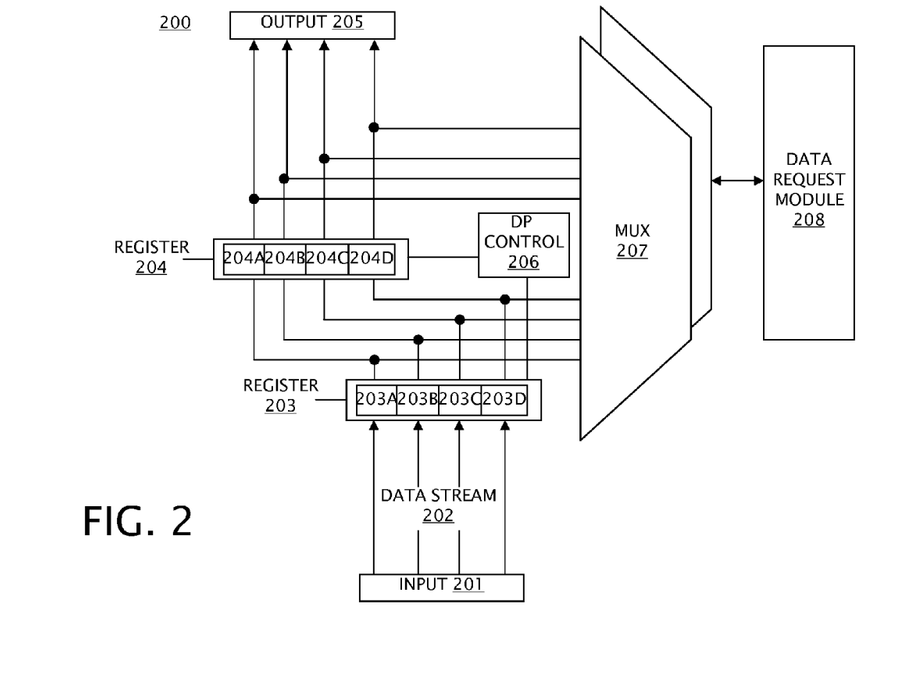
FIG. 2 illustrates an embodiment of a data path for data extraction from streaming data.

FIG. 2 illustrates an embodiment of a data path 200, which may comprise data path 103 of FIG. 1. Input 201 receives a data stream 202 from a MAC, such as MAC 102 of FIG. 1. The received data stream 202 proceeds sequentially through a pipeline that includes registers 203-204 en route to output 205, which sends the data stream 202 to an RPP, such as RPP 104 of FIG. 1. Registers 203 and 204 include data fields 203A-D and 204A-D, respectively. Data from data stream 201 first populates data fields 203A-D, then the data in data fields 203A-D moves to data fields 204A-D in register 204. Data path control 206 controls the progress of data stream 202 from input 201 through registers 203-204 to output 205; the functions of data path control 206 are discussed below in further detail with respect to FIGS. 3-6. Registers 203-204 are shown for illustrative purposes only; a data path 200 may include any appropriate number of registers, the registers may include any appropriate number of fields, and the fields may be any appropriate size, such as a byte or multiple bytes, in various embodiments. The width of the data contained in resisters 203-204 may be any number of bytes (e.g., 8 B, 16 B, 32 B, 64 B), though in some embodiments, the register width may be aligned with the width of the underlying physical interface (for example, 16 B for a 10 GbE MAC). The depth of the pipeline (i.e., the number of registers) may be any appropriate number, though a minimum of two registers may hide any latency incurred by the loading and the flushing of the data in the pipeline in some embodiments. For embodiments including network protocol processing in which relevant fields are contiguous to each other in the stream, a 32 byte pipeline (2 registers of 16 bytes each) is sufficient to store most typically used packet headers.

As data stream 202 passes through the pipeline comprising registers 203 and 204, every byte of the data stream 202 is exposed on the fly to multiplexing unit 207, as the multiplexing unit 207 is connected to each data field in the pipeline. Therefore, any data in the data stream 202 may be inspected and extracted regardless of its position in the stream 202 and the length of the stream 202 as the stream 202 passes through registers 203-204. Multiplexing unit 207 may include one or multiple multiplexers, and each multiplexer of multiplexing unit 207 may have access to every field of every register in the pipeline. Each multiplexer may extract one unit of data from the registers 203-204 per unit of time (for example, per clock cycle). Therefore, each additional multiplexer included in multiplexing unit 207 in data path 200 allows extraction of an additional unit of data per unit of time, resulting in faster processing of data stream 202, and also for extraction of variable amounts of data from data stream 202.

Data request module 208 receives requests for data from a stream processor, such as stream processor 104 of FIG. 1, fulfills the received requests by extracting data from stream 202 data via multiplexing unit 207, and sends the extracted data back to the stream processor. The data request module 208 may queue the received data requests until they can be fulfilled via the multiplexing unit 207. The stream processor 104 may issue one request per needed unit of data, or a single request may be for multiple units of data. The unit of data may be the same as the size of a data field (such as data fields 203A-D or 204A-D) in some embodiments. A request may include an index indicating the position of the requested data within the data stream. Alternatively, multiple requests may be encoded by means of a single pointer combined with a set of relative offsets (e.g., a 16 bits packet pointer plus three relative offsets of 5 bits) in order to request data located at multiple indices in the data stream. The data request module 208 replies to every request from the stream processor 104 with the requested data from the stream, which is extracted from the stream via the multiplexing unit 207. Data requests for 2 to 3 bytes are sufficient to parse various protocol stack combinations that are used over Ethernet, such as ISL, DIX, SAP/SNAP, VLAN, MPLS, PPPoE, IPv4, IPv6, TCP, or UDP. The data request module 208 is discussed in further detail below with respect to FIG. 7.

Figure 3:
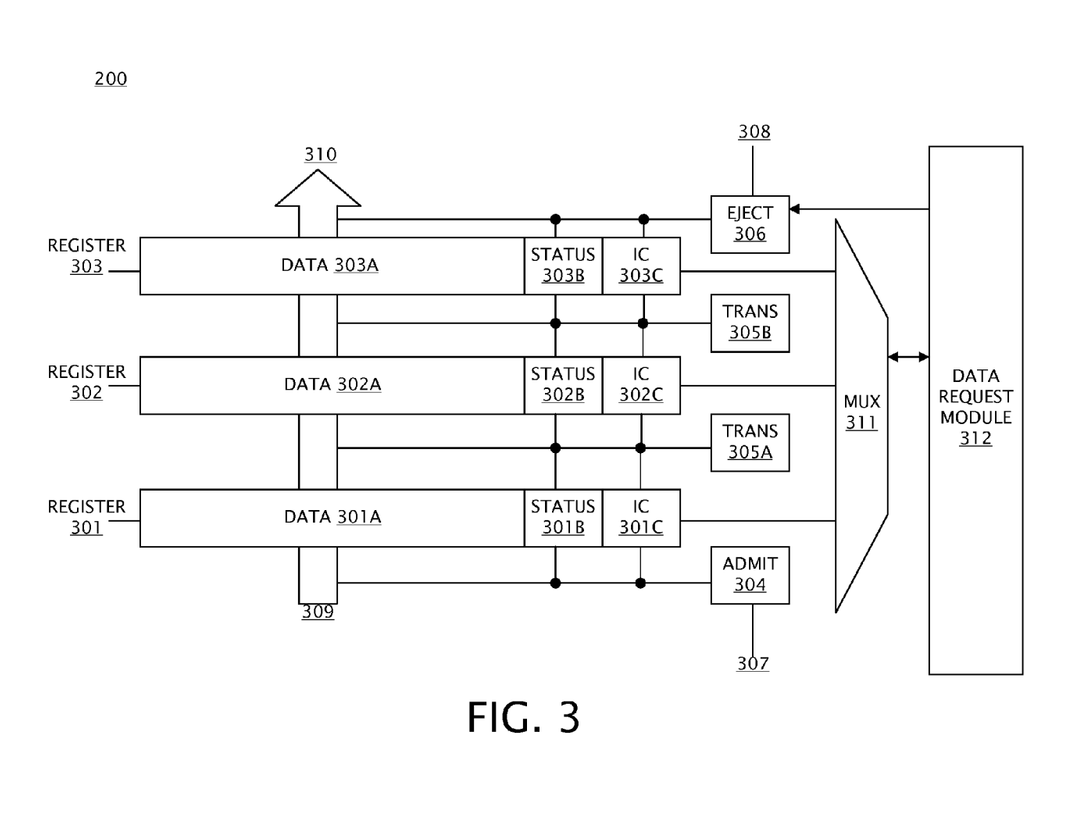
FIG. 3 illustrates another embodiment of a data path for data extraction from streaming data.

FIG. 3 illustrates another embodiment of a data path 300, such as data path 103 of FIG. 1. Data path 300 includes three registers 301-303, located between a data path input 309, which may communicate with a MAC such as MAC 103 of FIG. 1, and a data path output 310, which may communicate with an RPP such as RPP 105 of FIG. 1. Each of registers 301-303 includes respective register data (301A, 302A, 303A), which may be divided up into data fields of any appropriate size; a status indicator (301B, 302B, 303B); and an index counter (IC) (301C, 302C, 303C). The status indicators 301B, 302B, and 303B indicate whether the status indicator's respective register data (301A, 302A, or 303A) is empty or full. The ICs 301C, 302C, and 303C each hold the highest index in the data stream of the data in the IC's respective register data (301A, 302A, or 303A). The admit logic 304 is located between the first register 301 in the data path 300 and the data path input 309, and controls admission of data from data path input 309 into register 301. Admit logic 304 receives status data from the MAC (such as MAC 102 of FIG. 1) at MAC status input 307 indicating whether the MAC has received streaming data for the data path 300. Transfer logic 305A is located between register 301 and register 302, and controls movement of data from register 301 to register 302. Transfer logic 305B is located between register 302 and register 303, and controls movement of data from register 302 to register 303. Eject logic 306 is located between the last register 303 in data path 300 and data path output 310, and controls ejection of data from the data path from register 303 to data path output 310. Eject logic 306 receives status data from the RPP (such as RPP 105) at RPP status input 308 indicating whether the RPP has space to receive streaming data from the data path 300. Admit logic 304, transfer logic 305A-B, and eject logic 306 may together comprise a data path control module such as data path control module 206 of FIG. 2, and are discussed in further detail below with respect to FIGS. 4-6. Data request module 312 receives requests for data from a stream processor such as stream processor 104 of FIG. 1, and fulfils these requests via multiplexer unit 311; this process is discussed in further detail above with respect to multiplexer unit 207 and data request module 208 of FIG. 2, and below with respect to FIG. 7.

Figure 4:
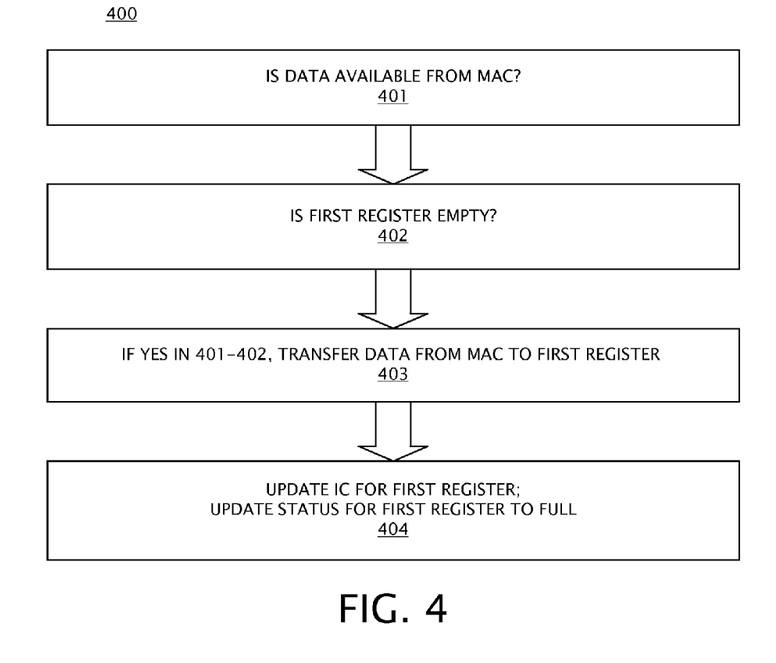
FIG. 4 is a schematic block diagram illustrating an embodiment of a method for an admit logic for a data path for data extraction from streaming data.

FIG. 4 illustrates an embodiment of a method 400 for an admit logic, such as admit logic 304 of FIG. 3. In block 401, it is determined if streaming data is available from the MAC based on MAC status input 307. In block 402, it is determined if the register data 301A of the first register 301 in the data path 300 is empty based on status indicator 301B. If data is available from the MAC, and status indicator 301B is equal to empty, data is transferred from the MAC into the register data 301A of register 301 in block 403. Then, in block 404, the status indicator 301B of register 301 is updated to full, and the index counter 301C of register 301 is updated to hold the highest index of the data in register data 301A. A data path includes a single admit logic implementing method 400 located between the first register of the data path and the MAC. The admit logic may be implemented in software, hardware, or a combination of software and hardware in various embodiments.

Figure 5:
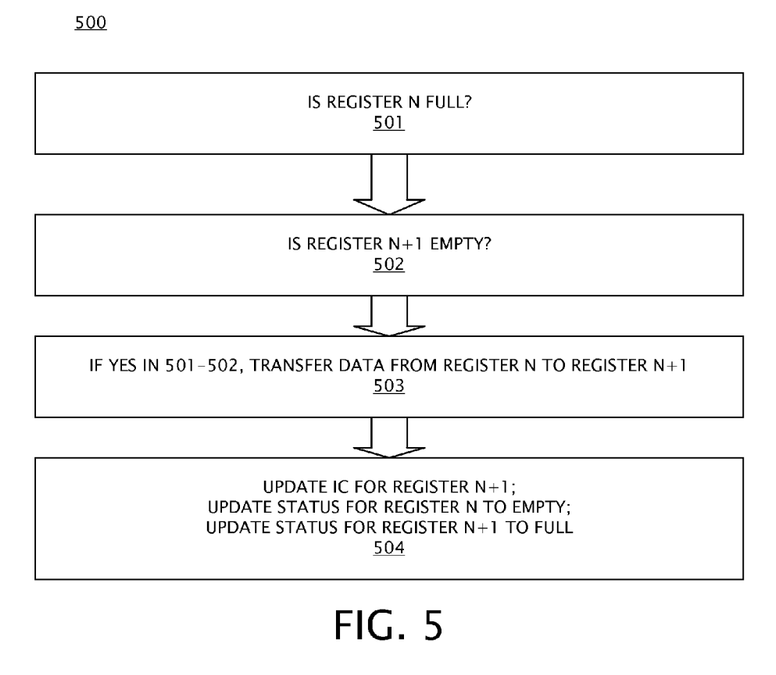
FIG. 5 is a schematic block diagram illustrating an embodiment of a method for a transfer logic for a data path for data extraction from streaming data.

FIG. 5 illustrates an embodiment of a method 500 for a transfer logic, such as transfer logic 305A or 305 B of FIG. 3. FIG. 5 is discussed with respect to transfer logic 305A. First, in block 501, it is determined if the register data 301A of register 301 is full based on status indicator 301B. Then, in block 502, it is determined if the register data 302A of register 302 is empty based on status indicator 302B. If status indicator 301B is equal to full and status indicator 302B is equal to empty, the data located in register data 301A is transferred to register data 302A in block 503. Then, in block 504, the status indicator 301B of register 301 is updated to empty, the status indicator 302B of register 302 is updated to full, and the index counter 302C of register 302 is updated to hold the highest index of the data in register data 302A. Transfer logic 305B similarly transfers data from register 302 to register 303 using method 500. In embodiments of a data path that includes N registers, a transfer logic implementing method 500 is located in between each set of two adjacent registers; therefore, the total number of transfer logic modules for the given data path is equal to the N−1. A transfer logic may be implemented in software, hardware, or a combination of software and hardware in various embodiments.

Figure 6:
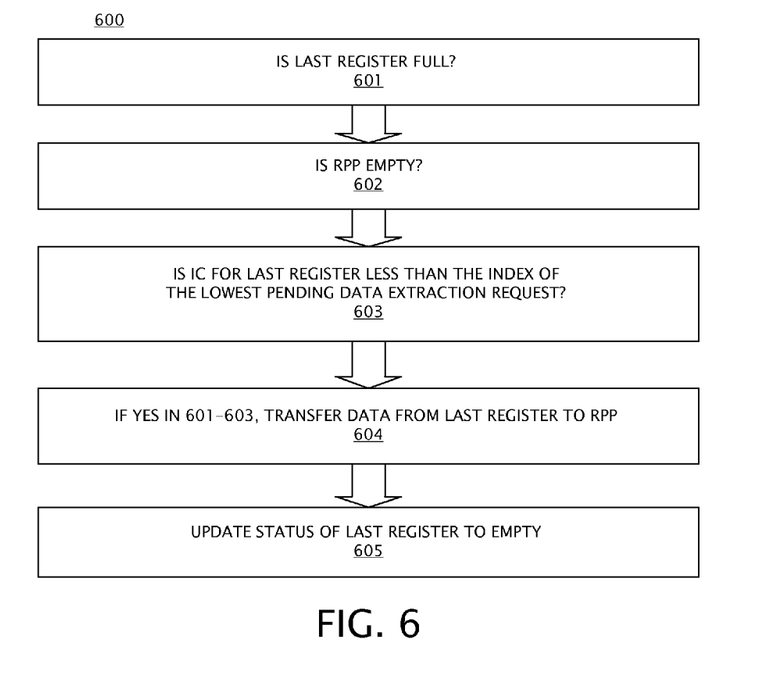
FIG. 6 is a schematic block diagram illustrating an embodiment of a method for an eject logic for a data path for data extraction from streaming data.

FIG. 6 illustrates an embodiment 600 for eject logic, such as eject logic 306 of FIG. 3. In block 601, it is determined if the register data 303A of the last register 303 in the data path 300 is full based on status indicator 303B. In block 602, it is determined if the RPP is empty based on RPP status input 308. In block 603, it is determined if the IC 303C is less than the index of the lowest-indexed pending data request in data request module 312 based on input from data request module 312. The determination of block 603 prevents stream data needed by the stream processor from being ejected from the data path 300 before it is extracted. If the status indicator 303B is equal to is full, the RPP is empty, and the IC 303C is less than the index of the lowest-indexed pending data request, then, in block 604, the data located in register 303 is transferred to the RPP at output 310. In block 605, the status indicator 303B is updated to empty. A data path includes a single eject logic implementing method 600 located between the last register of the data path and the RPP. The eject logic may be implemented in software, hardware, or a combination of software and hardware in various embodiments.

Figure 7:
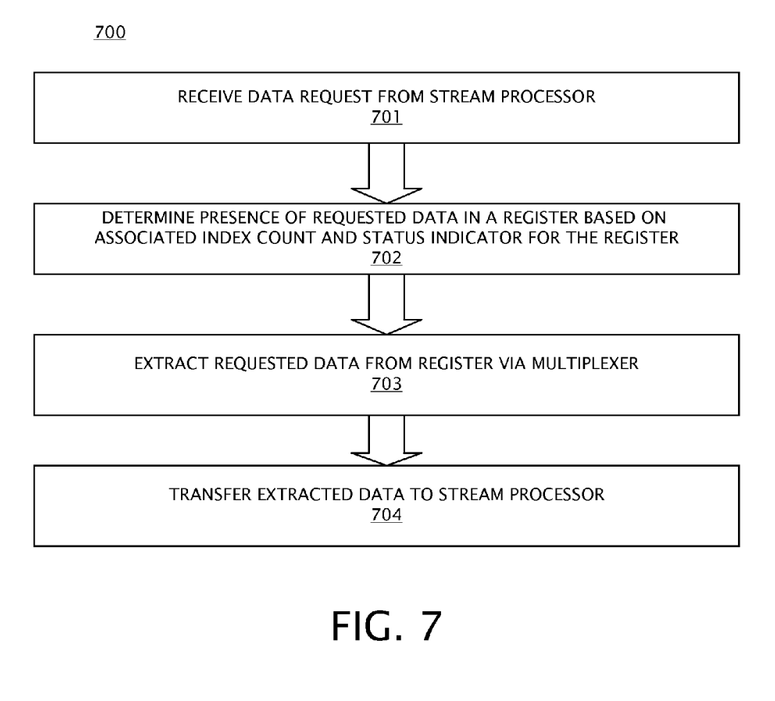
FIG. 7 is a schematic block diagram illustrating an embodiment of a method for data extraction for a data path for data extraction from streaming data.

FIG. 7 illustrates an embodiment of a data extraction method that may be implemented in data request module, such as data request module 208 or 312. FIG. 7 is discussed with respect to FIG. 3. In block 701, the data request module 312 receives one or more data requests from a stream processor (such as stream processor 104 of FIG. 1). It is then determined in block 702 whether the requested data is present in any of the registers 301-303 based on the index counters 301C, 302C, and 303C, and the status indicators 301B, 302B, and 303C (as data is only present in a register that is full). If the requested data is found in a register, it is then extracted from the register by a multiplexer of multiplexing unit 311 in block 703. In block 704, the extracted data is transferred to the stream processor by the data request module 312.

Figure 8:
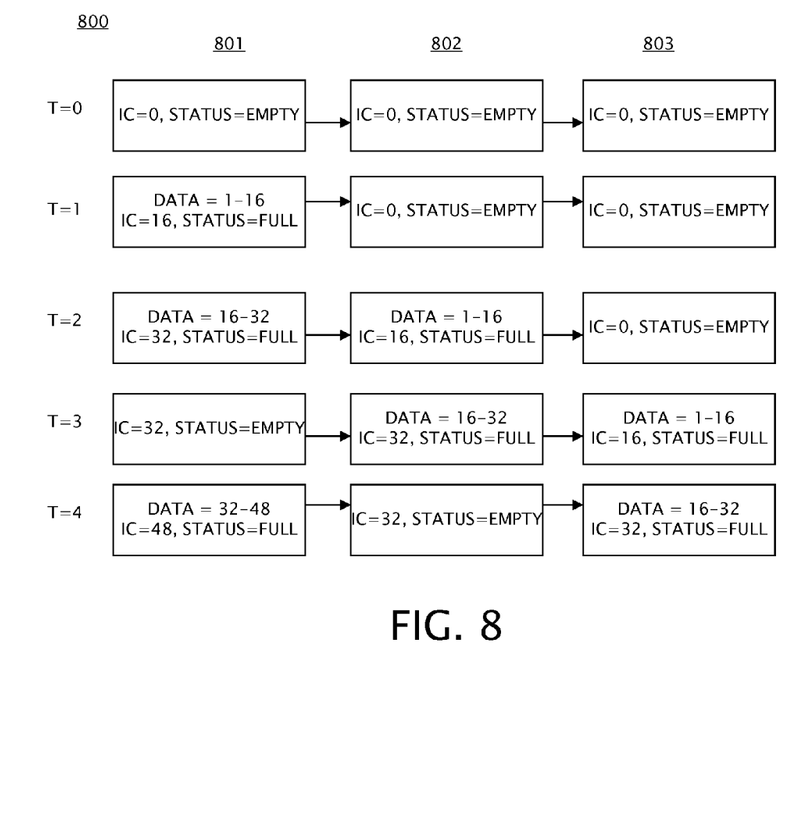
FIG. 8 is a schematic block diagram illustrating an embodiment of operation of a data path for data extraction from streaming data.

FIG. 8 schematic block diagram illustrating an embodiment of operation of a data path that includes 3 registers, 801-803. FIG. 8 is discussed with respect to FIGS. 4-7. Each row of FIG. 8 illustrates the data path at a moment in time, from T=0 to T=4. At time T=0, each of registers 801-803 is empty. This condition may occur, for example, at system startup, or between data streams. Between time T=0 and time T=1, a MAC associated with the data path receives data from a data stream (block 401), and register 801 is empty (block 402), so the admission logic associated with register 801 admits a first set of data, containing data having indices 1-16 of a received data stream, from the MAC to register 801 (block 403). The IC of register 801 is updated to 16, as 16 is the highest index of the data contained in register 801, and register 801's status indicator is updated to full (block 404). At time T=1, any data requests for any of data 1-16 may be extracted from register 801 by a multiplexing unit (not shown) associated with the data path comprising registers 801-803, according to method 700 of FIG. 7. The number of data requests that may be fulfilled per unit of time is dependent on the number of multiplexers in the multiplexing unit.

Between time T=1 and time T=2, because register 801 is full (block 501) and register 802 is empty (block 502), the transfer logic between registers 801 and 802 transfers data 1-16 from register 801 to 802 (block 503), updates the IC of register 802 to 16 and the status indicator of register 802 to full, and updates the status indicator of register 801 to empty (block 504), which triggers the admission logic associated with register 801. As the MAC has more data available (block 401) and register 801 is empty (block 402), the admission logic admits a second set of data, containing data indexed at positions 16-32 in the stream, from the MAC to register 801 (block 403). The status indicator of register 801 is updated to full, and the IC of register 801 is updated to 32 (block 404). At time T=2, any data requests for any of data 1-16 may be extracted from register 802, and any data requests for any of data 16-32 may be extracted from register 801, according to method 700 of FIG. 7.

Between time T=2 and time T=3, because register 802 is full (block 501) and register 803 is empty (block 502), the transfer logic between registers 802 and 803 transfers data 1-16 from register 802 to 803 (block 503), updates the IC of register 803 to 16 and the status indicator of register 803 to full, and updates the status indicator of register 802 to empty (block 504), which triggers the transfer logic associated with register 802 and register 801. Because register 801 is full (block 501) and register 802 is empty (block 502), the transfer logic between registers 801 and 801 transfers data 16-32 from register 801 to 802 (block 503), updates the IC of register 803 to 32 and the status indicator of register 802 to full, and updates the status indicator of register 801 to empty (block 504). At time T=3, the MAC has not received additional data from the data stream, so no data is admitted from the MAC to empty register 801 at time T=3. At time T=3, any data requests for any of data 1-16 may be extracted from register 803, and any data requests for any of data 16-32 may be extracted from register 802, according to method 700 of FIG. 7.

Between time T=3 and time T=4, register 803 is full (block 601) and the RPP is empty (block 602), so the eject logic associated with register 803 determines if there are any pending data requests for data having an index that is less than the IC of register 803, i.e., less than 16 (block 603). If there are no pending data requests having an index in the data stream that is less than 16, data 1-16 are ejected from register 803 to the RPP (block 604), and the status indicator of register 803 is set to empty (block 605), which triggers the transfer logic associated with register 803 and register 802. Because register 802 is full (block 501) and register 802 is empty (block 502), the transfer logic between registers 802 and 803 transfers data 16-32 from register 802 to 803 (block 503), updates the IC of register 803 to 32 and the status indicator of register 802 to full, and updates the status indicator of register 802 to empty (block 504). At this point, register 801 is empty, so no data transfers into register 802. However, the MAC has received more data from the data stream (block 401) and register 801 is empty (block 402), a third set of data including data 32-48 of the data stream is admitted to register 801 by the admit logic (block 403). The IC associated with register 801 is updated to 48, and the status indicator of register 801 is updated to full (block 404). At time T=4, any data requests for any of data 16-32 may be extracted from register 803, and any data requests for any of data 32-48 may be extracted from register 801, according to method 700 of FIG. 7. As illustrated by FIG. 8, the streaming data is available for extraction by the multiplexers for its entire journey through the sequence of registers 801-803, allowing efficient recovery of data from the data stream.

Figure 9:
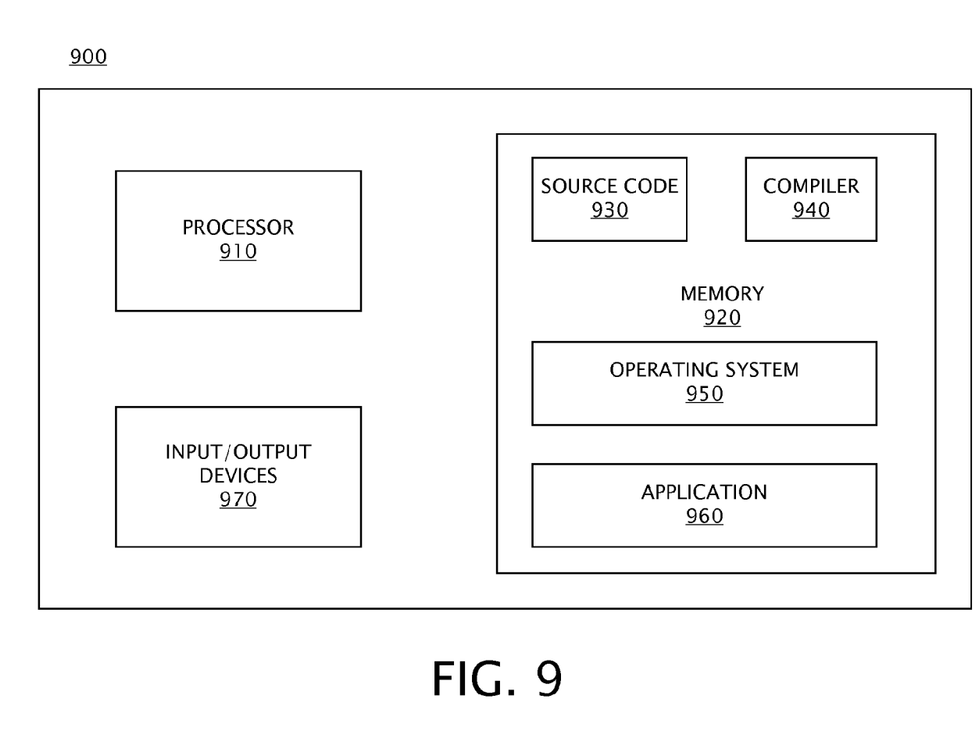
FIG. 9 is a schematic block diagram illustrating an embodiment of a computing system that may be used in conjunction with a data path for data extraction from streaming data.

FIG. 9 illustrates an example of a computing system 900 which may be utilized by exemplary embodiments of a data path for data extraction from streaming data as embodied in software. Various operations discussed above may utilize the capabilities of the computer 900. One or more of the capabilities of the computer 900 may be incorporated in any element, module, application, and/or component discussed herein.

The computer 900 includes, but is not limited to, PCs, workstations, laptops, PDAs, palm devices, servers, storages, and the like. Generally, in terms of hardware architecture, the computer 900 may include one or more processors 910, memory 920, and one or more input and/or output (I/O) devices 970 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 910 is a hardware device for executing software that can be stored in the memory 920. The processor 910 can be virtually any custom made or commercially available processor, a central processing unit (CPU), a digital signal processor (DSP), or an auxiliary processor among several processors associated with the computer 900, and the processor 910 may be a semiconductor based microprocessor (in the form of a microchip) or a macroprocessor.

The memory 920 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 920 may incorporate electronic, magnetic, optical, and/or other types of storage media. Note that the memory 920 can have a distributed architecture, where various components are situated remote from one another, but can be accessed by the processor 910.

The software in the memory 920 may include one or more separate programs, each of which comprises an ordered listing of executable instructions for implementing logical functions. The software in the memory 920 includes a suitable operating system (O/S) 950, compiler 940, source code 930, and one or more applications 960 in accordance with exemplary embodiments. As illustrated, the application 960 comprises numerous functional components for implementing the features and operations of the exemplary embodiments. The application 960 of the computer 900 may represent various applications, computational units, logic, functional units, processes, operations, virtual entities, and/or modules in accordance with exemplary embodiments, but the application 960 is not meant to be a limitation.

The operating system 950 controls the execution of other computer programs, and provides scheduling, input-output control, file and data management, memory management, and communication control and related services. It is contemplated by the inventors that the application 960 for implementing exemplary embodiments may be applicable on all commercially available operating systems.

Application 960 may be a source program, executable program (object code), script, or any other entity comprising a set of instructions to be performed. When a source program, then the program is usually translated via a compiler (such as the compiler 940), assembler, interpreter, or the like, which may or may not be included within the memory 920, so as to operate properly in connection with the O/S 950. Furthermore, the application 960 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, .NET, and the like.

The I/O devices 970 may include input devices such as, for example but not limited to, a mouse, keyboard, scanner, microphone, camera, etc. Furthermore, the I/O devices 970 may also include output devices, for example but not limited to a printer, display, etc. Finally, the I/O devices 970 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 970 also include components for communicating over various networks, such as the Internet or intranet.

If the computer 900 is a PC, workstation, intelligent device or the like, the software in the memory 920 may further include a basic input output system (BIOS) (omitted for simplicity). The BIOS is a set of essential software routines that initialize and test hardware at startup, start the O/S 950, and support the transfer of data among the hardware devices. The BIOS is stored in some type of read-only-memory, such as ROM, PROM, EPROM, EEPROM or the like, so that the BIOS can be executed when the computer 900 is activated.

When the computer 900 is in operation, the processor 910 is configured to execute software stored within the memory 920, to communicate data to and from the memory 920, and to generally control operations of the computer 900 pursuant to the software. The application 960 and the O/S 950 are read, in whole or in part, by the processor 910, perhaps buffered within the processor 910, and then executed.

When the application 960 is implemented in software it should be noted that the application 960 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 960 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 960 is implemented in hardware, the application 960 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include processing of stream data with relatively low latency, relatively low power consumption, and relatively small hardware footprint.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for extracting data from streaming data in a data path, comprising:
   moving the streaming data sequentially through a plurality of sequential data registers of the data path, each of the plurality of sequential data registers comprising a plurality of data fields, wherein moving the streaming data sequentially through the plurality of sequential data registers further comprises ejecting a portion of the streaming data from a last data register of the plurality of sequential data registers to a received packet processor (RPP) module in response to the last data register of the plurality of sequential data registers being full, the RPP module being empty, and an index of the streaming data in the last data register being less than an index of a lowest-indexed pending data request; and
   extracting data from the streaming data as the streaming data moves through the sequential data registers by a multiplexing unit in response to a data request, wherein the multiplexing unit is configured such that the multiplexing unit has access to each of the plurality of data fields of the plurality of sequential data registers.

2. The method claim 1, wherein moving the streaming data sequentially through the plurality of sequential data registers comprises transferring a portion of the streaming data from a medium access control (MAC) interface into a first data register of the plurality of sequential data registers in response to streaming data being available from the MAC and the first data register being empty.

3. The method of claim 1, wherein moving the streaming data sequentially through the plurality of sequential data registers further comprises transferring a portion of the streaming data from a first data register of a pair of sequential data registers of the plurality of sequential data registers to a second data register of the pair of sequential data registers in response to the first data register of the pair of sequential data registers being full and the second data register of the pair of sequential data registers being empty.

4. A computer program product comprising a non-transitory computer readable storage medium containing computer code that, when executed by a computer, implements a method for extracting data from streaming data in a data path, wherein the method comprises:
   moving the streaming data sequentially through a plurality of sequential data registers of the data path, each of the plurality of sequential data registers comprising a plurality of data fields, wherein moving the streaming data sequentially through the plurality of sequential data registers further comprises ejecting a portion of the streaming data from a last data register of the plurality of sequential data registers to a received packet processor (RPP) module in response to the last data register of the plurality of sequential data registers being full, the RPP module being empty, and an index of the streaming data in the last data register being less than an index of a lowest-indexed pending data request; and
   extracting data from the streaming data as the streaming data moves through the sequential data registers by a multiplexing unit in response to a data request, wherein the multiplexing unit is configured such that the multiplexing unit has access to each of the plurality of data fields of the plurality of sequential data registers.

5. The computer program product according to claim 4, wherein moving the streaming data sequentially through the plurality of sequential data registers comprises transferring a portion of the streaming data from a medium access control (MAC) interface into a first data register of the plurality of sequential data registers in response to streaming data being available from the MAC and the first data register being empty.

6. The computer program product according to claim 4, wherein moving the streaming data sequentially through the plurality of sequential data registers further comprises transferring a portion of the streaming data from a first data register of a pair of sequential data registers of the plurality of sequential data registers to a second data register of the pair of sequential data registers in response to the first data register of the pair of sequential data registers being full and the second data register of the pair of sequential data registers being empty.

7. A data path for streaming data, comprising:
   a plurality of sequential data registers, each of the plurality of sequential data registers comprising a plurality of data fields, wherein the streaming data moves sequentially through the sequential data registers;
   a multiplexing unit, the multiplexing unit configured such that the multiplexing unit has access to each of the plurality of data fields of the plurality of sequential data registers, and wherein the multiplexing unit is configured to extract data from the streaming data as the streaming data moves through the sequential data registers in response to a data request; and
   a transfer logic, the transfer logic being associated with a respective pair of sequential data registers of the plurality of sequential data registers, the transfer logic being configured to transfer the streaming data from a first data register of the respective pair of sequential data registers to a second data register of the respective pair of sequential data registers, the data path further comprising a plurality of transfer logics, each transfer logic being associated with a respective pair of sequential data registers of the plurality of sequential data registers, and wherein a number of the plurality of transfer logics is equal to a number of the plurality of sequential data registers minus one.

8. A data path for streaming data, comprising:
   a plurality of sequential data registers, each of the plurality of sequential data registers comprising a plurality of data fields, wherein the streaming data moves sequentially through the sequential data registers;
   a multiplexing unit, the multiplexing unit configured such that the multiplexing unit has access to each of the plurality of data fields of the plurality of sequential data registers, and wherein the multiplexing unit is configured to extract data from the streaming data as the streaming data moves through the sequential data registers in response to a data request; and an eject logic configured to eject the streaming data from a last data register of the plurality of sequential data registers to a received packet processor (RPP) module, wherein the eject logic is configured to eject a portion of the streaming data in response to the last data register of the plurality of sequential data registers being full, the RPP module being empty, and an index of the streaming data in the last data register being less than an index of a lowest-indexed pending data request.

9. A data path for streaming data, comprising:

a plurality of sequential data registers, each of the plurality of sequential data registers comprising a plurality of data fields, wherein the streaming data moves sequentially through the sequential data registers; and a multiplexing unit, the multiplexing unit configured such that the multiplexing unit has access to each of the plurality of data fields of the plurality of sequential data registers, and wherein the multiplexing unit is configured to extract data from the streaming data as the streaming data moves through the sequential data registers in response to a data request;

the data path configured to:
  receive a plurality of data requests, each of the plurality of data requests having a respective index in the streaming data, from a stream processor;
  extract data from the streaming data in the plurality of sequential data registers via the multiplexing unit in response to the plurality of data requests based on the respective indices; and
  send the extracted data to the stream processor.

10. A method for extracting data from streaming data in a data path, comprising:

moving the streaming data sequentially through a plurality of sequential data registers of the data path, each of the plurality of sequential data registers comprising a plurality of data fields; and
  extracting data from the streaming data as the streaming data moves through the sequential data registers by a multiplexing unit in response to a data request, wherein the multiplexing unit is configured such that the multiplexing unit has access to each of the plurality of data fields of the plurality of sequential data registers, wherein extracting data from the streaming data as the streaming data moves through the sequential data registers by a multiplexing unit in response to a data request comprises:
    receiving a plurality of data requests, each of the plurality of data requests having a respective index in the streaming data, from a stream processor;
    extracting data from the streaming data in the plurality of sequential data registers via the multiplexing unit in response to the plurality of data requests based on the respective indices; and
    sending the extracted data to the stream processor.

11. A computer program product comprising a non-transitory computer readable storage medium containing computer code that, when executed by a computer, implements a method for extracting data from streaming data in a data path, wherein the method comprises:

moving the streaming data sequentially through a plurality of sequential data registers of the data path, each of the plurality of sequential data registers comprising a plurality of data fields; and
  extracting data from the streaming data as the streaming data moves through the sequential data registers by a multiplexing unit in response to a data request, wherein the multiplexing unit is configured such that the multiplexing unit has access to each of the plurality of data fields of the plurality of sequential data registers, wherein extracting data from the streaming data as the streaming data moves through the sequential data registers by a multiplexing unit in response to a data request comprises:
    receiving a plurality of data requests, each of the plurality of data requests having a respective index in the streaming data, from a stream processor;
    extracting data from the streaming data in the plurality of sequential data registers via the multiplexing unit in response to the plurality of data requests based on the respective indices; and
  sending the extracted data to the stream processor.

* * * * *